(12) United States Patent
Barinov

(10) Patent No.: US 11,055,148 B2
(45) Date of Patent: Jul. 6, 2021

(54) SYSTEMS AND METHODS FOR OVERLOAD PROTECTION FOR REAL-TIME COMPUTING ENGINES

(71) Applicant: Genesys Telecommunications Laboratories, Inc., Daly City, CA (US)

(72) Inventor: Vitaly Y. Barinov, Clayton, CA (US)

(*) Notice: Subject to any disclaimer, the term of this patent is extended or adjusted under 35 U.S.C. 154(b) by 361 days.

(21) Appl. No.: 15/792,058

(22) Filed: Oct. 24, 2017

(65) Prior Publication Data

US 2019/0121676 A1 Apr. 25, 2019

(51) Int. Cl.
| | |
|---|---|
| *G06F 9/50* | (2006.01) |
| *H04M 3/51* | (2006.01) |
| *G06F 11/14* | (2006.01) |
| *H04M 3/523* | (2006.01) |

(52) U.S. Cl.
CPC ........ *G06F 9/5083* (2013.01); *G06F 11/1415* (2013.01); *H04M 3/5238* (2013.01); *G06F 2201/805* (2013.01); *H04M 3/5175* (2013.01); *H04M 2203/402* (2013.01)

(58) Field of Classification Search
None
See application file for complete search history.

(56) References Cited

U.S. PATENT DOCUMENTS

| | | | |
|---|---|---|---|
| 2002/0089936 A1 | 7/2002 | Givoly | |
| 2005/0091657 A1* | 4/2005 | Priem | G06F 9/5083 718/104 |
| 2013/0290492 A1* | 10/2013 | ElArabawy | H04L 47/2416 709/219 |
| 2015/0117629 A1* | 4/2015 | Ristock | H04M 3/5232 379/265.03 |
| 2016/0036985 A1 | 2/2016 | Koren et al. | |

OTHER PUBLICATIONS

International Search Report and Written Opinion of International Searching Authority, dated Jan. 29, 2019 in related application PCT/US2018/056997, filed Oct. 23, 2018.

* cited by examiner

*Primary Examiner* — Lewis A Bullock, Jr.
*Assistant Examiner* — Melissa A Headly

(57) ABSTRACT

A method for providing overload protection to a real-time computational engine configured to compute a plurality of values corresponding to a plurality of entities includes, when an overload protector is in an overload state: identifying one or more entities in a normal status and having high corresponding load contributions; downgrading the identified one or more entities; in response to detecting that a load level is below a low threshold, transitioning the overload protector to a recovery state and beginning a cool down period; and, when the overload protector is in the recovery state: upgrading a first group of entities of the one or more downgraded entities to a normal status; determining whether the cool down period has ended; and in response to determining that the cool down period has ended: upgrading all downgraded entities to the normal status.

18 Claims, 9 Drawing Sheets

SYSTEMS AND METHODS FOR OVERLOAD PROTECTION FOR REAL-TIME COMPUTING ENGINES

BACKGROUND

1. Field

Aspects of embodiments of the present invention relate to managing workloads on computing devices configured to compute values of entities in real-time or near real-time, such as real-time statistical engines supporting a contact center.

2. Related Art

In the field of computing systems, the responsiveness of a computing system generally depends on its current load. For example, when the rate at which input data arrives is relatively low, then the responsiveness may be high (e.g., low latency) because the computing system has sufficient capacity to process the data as it arrives. However, if the input data arrives more quickly (e.g., at a higher rate) than the computing system can process the data, an overload condition may occur (e.g., the CPU load may reach 100% or the network connection may be saturated). This overload condition may cause the responsiveness of the system to decrease (e.g., latency may increase), and may result in delays in the computation of new values or data loss if the computing system is unable to store the incoming data (e.g., if any input buffers are full).

For example, real-time statistical engines that monitor external data sources and use the received data to compute one or more on-demand statistics sometimes suffer from overload conditions. These real-time statistical engines may be used to monitor conditions in a data center and/or at a contact center, such as tracking average interaction handling time (AHT) between customers and agents of the contact center, average waiting time of customers, customer queue lengths, server loads (e.g., CPU, memory, and network usage), interaction abandonment rate, agent occupancy, and the like.

Spikes in the rate at which data is received from the external data sources (e.g., the call queues or call server) and/or spikes in the number of requested statistics can cause an overload of the real-time statistical engines if the real-time statistical engine is non-scalable or only partially scalable (as is frequently the case for legacy applications). For example, each new incoming interaction (e.g., a call, an email, or a chat session) to a contact center may cause at least one event to fire. These overload conditions can cause delays in the computation of values that may be important or critical to the correct function of other infrastructure in the contact center, such as a routing server. These overload conditions may also cause data loss if the real-time statistical engine is unable to process all of the data from the external data sources, thereby causing inaccurate statistics to be calculated (e.g., because not all of the interactions are being counted).

SUMMARY

Aspects of embodiments of the present invention relate to systems and methods for providing overload protection to computing systems. Overload protection techniques may prevent or reduce the likelihood of data loss by reducing the load on computing systems in order to avoid an overload state where data may be significantly delayed or lost.

Some aspects of embodiments of the present invention relate to providing overload protection to computing systems that are configured to perform, in real-time or substantially real time, computations of a values corresponding to a collection of entities and to provide the values of the entities to one or more subscribers. The real-time computer systems may be non-scalable or only partially scalable (e.g., where additional computing resources cannot be allocated to the application to process the additional load), thereby limiting or making it difficult for such systems to allocate additional resources to process the additional load. As such, systems and methods for overload protection according to some embodiments of the present invention reduce the quality of service of some of the entities (e.g., by reducing the rate at which values are provided to the subscribers or by changing the method in which the values are calculated to a less accurate, but computationally simpler value). As such, aspects of embodiments of the present invention allow such systems to continue providing real-time information under high load conditions, without significant data loss, or by performing a controlled degradation of the data values generated for the entities.

Some aspects of embodiments of the present invention relate to application specific techniques for providing overload protection for real-time statistical engines, where the entities correspond to statistics relevant to the operation of a contact center and/or a data center.

According to one embodiment of the present invention, a method for providing overload protection to a real-time computational engine configured to compute a plurality of values corresponding to a plurality of entities, the overload protection being provided by an overload protector having a one of a plurality of states at any given time, the states including: a normal state; an overload state; and a recovery state includes: when the overload protector is in the normal state: detecting a first load level of a computer system executing the real-time computational engine; and in response to detecting that the first load level exceeds a high threshold, transitioning the overload protector to the overload state; when the overload protector is in the overload state: identifying one or more entities in a normal status and having high corresponding load contributions; downgrading the identified one or more entities to a downgraded status, each of the one or more entities having a lower load contribution in the downgraded status than in the normal status; detecting a second load level of the computer system; and in response to detecting that the second load level is below a low threshold, transitioning the overload protector to a recovery state and beginning a cool down period; and when the overload protector is in the recovery state: upgrading a first group of entities of the one or more downgraded entities to a normal status; detecting a third load level of the computer system; in response to determining that the third load level exceeds the low threshold, transitioning the overload protector to the overload state; in response to determining that the third load level is below the low threshold, determining whether the cool down period has ended; and in response to determining that the cool down period has ended: upgrading all downgraded entities to the normal status; and transitioning the overload protector to the normal state.

Each entity of the identified one or more entities may be associated with a downgrade policy, and the downgrading the identified one or more entities may include applying the downgrade policy to a corresponding entity of the one or more entities. The downgrade policy may cause the real-time computation engine to reduce a rate at which the value associated with the corresponding entity is calculated. The downgrade policy may cause the real-time computation engine to stop calculating the value associated with the corresponding entity. The real-time computation engine may be configured to: receive a plurality of events from an external data source, in response to receiving the events, update a plurality of aggregates received events, each aggregate of the plurality of aggregates being associated with one of the entities, wherein the values associated with the entities may be computed in based on the aggregates, and wherein the downgrade policy may be configured to cause the real-time computation engine to stop updating one or more aggregates associated with the corresponding entity.

Each of the entities may be associated with a corresponding hit-count, and the identifying the one or more entities having high load contribution may include identifying one or more entities having a high hit-count.

Each of the entities may be associated with a corresponding priority, and the identifying the one or more entities having high corresponding load contributions may further include sorting the entities according to the corresponding priority and identifying entities having lowest priority.

Each of the entities may be associated with a corresponding priority, and the identifying the one or more entities having high corresponding load contributions may further include identifying one or more entities that have priorities that ae non-critical.

The real-time computational engine may include a statistical engine of a contact center, and each of the entities may be a statistic corresponding to an aspect of contact center operations. The statistics may include at least one of average handling time, average waiting time, queue length, server load, interaction abandonment rate, and agent occupancy.

The method may further include displaying the values calculated by the real-time computation engine on a display device.

According to one embodiment of the present invention, a system includes: a processor; and memory having instructions stored thereon that, when executed by a processor, cause the processor to: execute a real-time computational engine configured to compute a plurality of values corresponding to a plurality of entities; and execute an overload protector configured to provide overload protection to the system, the overload protector having a one of a plurality of states at any given time, the states comprising: a normal state; an overload state; and a recovery state, the memory further having instructions stored thereon that, when execute by the processor, cause the processor to: when the overload protector is in the normal state: detect a first load level of a computer system executing the real-time computational engine; and in response to detecting that the first load level exceeds a high threshold, transition the overload protector to the overload state; when the overload protector is in the overload state: identify one or more entities in a normal status and having high corresponding load contributions; downgrade the identified one or more entities to a downgraded status, each of the one or more entities having a lower load contribution in the downgraded status than in the normal status; detect a second load level of the computer system; and in response to detecting that the second load level is below a low threshold, transition the overload protector to a recovery state and begin a cool down period; and when the overload protector is in the recovery state: upgrade a first group of entities of the one or more downgraded entities to a normal status; detect a third load level of the computer system; in response to determining that the third load level exceeds the low threshold, transition the overload protector to the overload state; in response to determining that the third load level is below the low threshold, determine whether the cool down period has ended; and in response to determining that the cool down period has ended: upgrade all downgraded entities to the normal status; and transition the overload protector to the normal state.

Each entity of the identified one or more entities may be associated with a downgrade policy, and the memory may further store instructions that, when executed by the processor, cause the processor to downgrade the identified one or more entities by applying the downgrade policy to a corresponding entity of the one or more entities.

The downgrade policy may include instructions that, when executed by the processor, cause the real-time computation engine to reduce a rate at which the value associated with the corresponding entity is calculated.

The downgrade policy may include instructions that, when executed by the processor, cause the real-time computation engine to stop calculating the value associated with the corresponding entity.

The memory may further include instructions that, when executed by the processor, cause the real-time computation engine to: receive a plurality of events from an external data source, in response to receiving the events, update a plurality of aggregates received events, each aggregate of the plurality of aggregates being associated with one of the entities, wherein the values associated with the entities are computed in based on the aggregates, and the downgrade policy may include instructions that, when executed by the processor, cause the real-time computation engine to stop updating one or more aggregates associated with the corresponding entity.

Each of the entities may be associated with a corresponding hit-count, and the instructions that cause the processor to identify the one or more entities having high load contribution may include instructions that cause the processor to identify one or more entities having a high hit-count.

Each of the entities may be associated with a corresponding priority, and the instructions that cause the processor to identify the one or more entities having high corresponding load contributions may further include instructions that cause the processor to sort the entities according to the corresponding priority and to identify entities having lowest priority.

Each of the entities is associated with a corresponding priority, and the instructions that cause the processor to identify the one or more entities having high corresponding load contributions may further include instructions that cause the processor to one or more entities that have priorities that ae non-critical.

The real-time computational engine may include a statistical engine of a contact center, and each of the entities may be a statistic corresponding to an aspect of contact center operations.

The statistics may include at least one of average handling time, average waiting time, queue length, server load, interaction abandonment rate, and agent occupancy.

The memory may further store instructions that, when executed by the processor, cause the processor to display the values calculated by the real-time computation engine on a display device.

According to one embodiment of the present invention, a system for providing overload protection to a real-time computational engine configured to compute a plurality of values corresponding to a plurality of entities, the overload protection being provided by an overload protector having a one of a plurality of states at any given time, the states comprising: a normal state; an overload state; and a recovery state includes: means for, when the overload protector is in the normal state: detecting a first load level of a computer system executing the real-time computational engine; and in response to detecting that the first load level exceeds a high threshold, transitioning the overload protector to the overload state; means for, when the overload protector is in the overload state: identifying one or more entities in a normal status and having high corresponding load contributions; downgrading the identified one or more entities to a downgraded status, each of the one or more entities having a lower load contribution in the downgraded status than in the normal status; detecting a second load level of the computer system; and in response to detecting that the second load level is below a low threshold, transitioning the overload protector to a recovery state and beginning a cool down period; and means for, when the overload protector is in the recovery state: upgrading a first group of entities of the one or more downgraded entities to a normal status; detecting a third load level of the computer system; in response to determining that the third load level exceeds the low threshold, transitioning the overload protector to the overload state; in response to determining that the third load level is below the low threshold, determining whether the cool down period has ended; and in response to determining that the cool down period has ended: upgrading all downgraded entities to the normal status; and transitioning the overload protector to the normal state.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
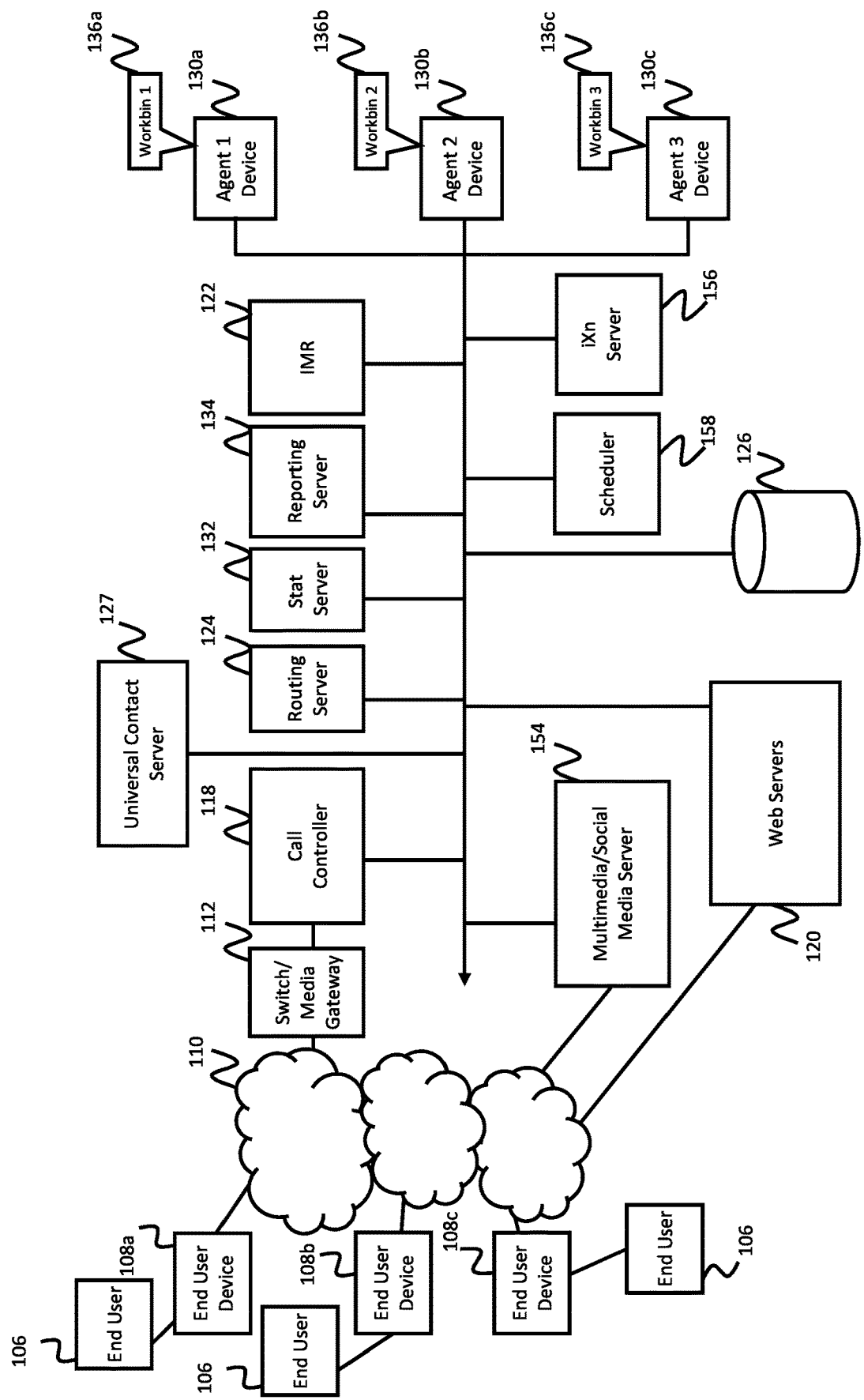
FIG. 1 is an architectural diagram of a communication infrastructure including a communication center in an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to systems and methods for providing overload protection for computing systems, such as systems that compute information in real-time (or substantially real-time) information on statistical engines that may be implemented on a statistics server of a contact center and/or of a data center.

Contact Center Overview

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system delivers services via telephone or other communication mechanisms through the use of Information and Communication Technology (ICT) resources (e.g. personnel, computers, and telecommunication equipment). The contact center system manages its usage of these ICT resources, and other management systems, such as network management systems, manage the ICT resources themselves. Such services may vary depending on the type of contact center, and may range from customer service to help desk, emergency response, telemarketing, order taking, and the like.

Customers, potential customers, or other end users (collectively referred to as customers or end users, e.g., end users 106) desiring to receive services from the contact center may initiate inbound communications or interactions (e.g., telephony calls, text messages, chat messages, and emails) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server (or stat server) 132.

In some embodiments, the routing server 124 may query a customer database, which stores information about existing clients, such as contact information, service level agreement (SLA) requirements, nature of previous customer contacts and actions taken by contact center to resolve any customer issues, and the like. The routing server may also query other data stores, such as a workforce management system for accessing information about the line of business. The routing server may also perform a remote function call (or remote procedure call RPC) and incorporate the response to the remote function call in the strategy execution. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like), and may be created from a data warehouse (e.g., analytics data generated from processing information about previous interactions at the contact center, such as the Genesys® Interaction Concentrator and the Genesys® Info Mart).

The contact center system may further include a scheduler 158 for scheduling and managing the other components of the contact center system, as described in more detail below.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Overload Protection

Aspects of embodiments of the present invention will be described herein in the context of providing overload protection for a real-time statistical engine, such as the applications provided by the statistics server 132 of a contact center. However, embodiments of the present invention are not limited thereto and may also be applicable in other contexts, such as statistical servers or other monitoring systems in other contexts, such as infrastructure monitoring systems for data centers and cloud computing providers, monitoring systems for infrastructure for web-based service providers, and monitoring systems for other contexts that may be subject to spikes in activity. As additional examples, aspects of embodiments of the present invention may be applied to providing overload protection to computing systems configured to provide real-time or near real-time computation of a plurality of different values corresponding to a plurality of different entities based on real-time or near-real time input data (e.g., events or messages), and providing the computed values of the entities to clients subscribing to the entities.

Figure 2:
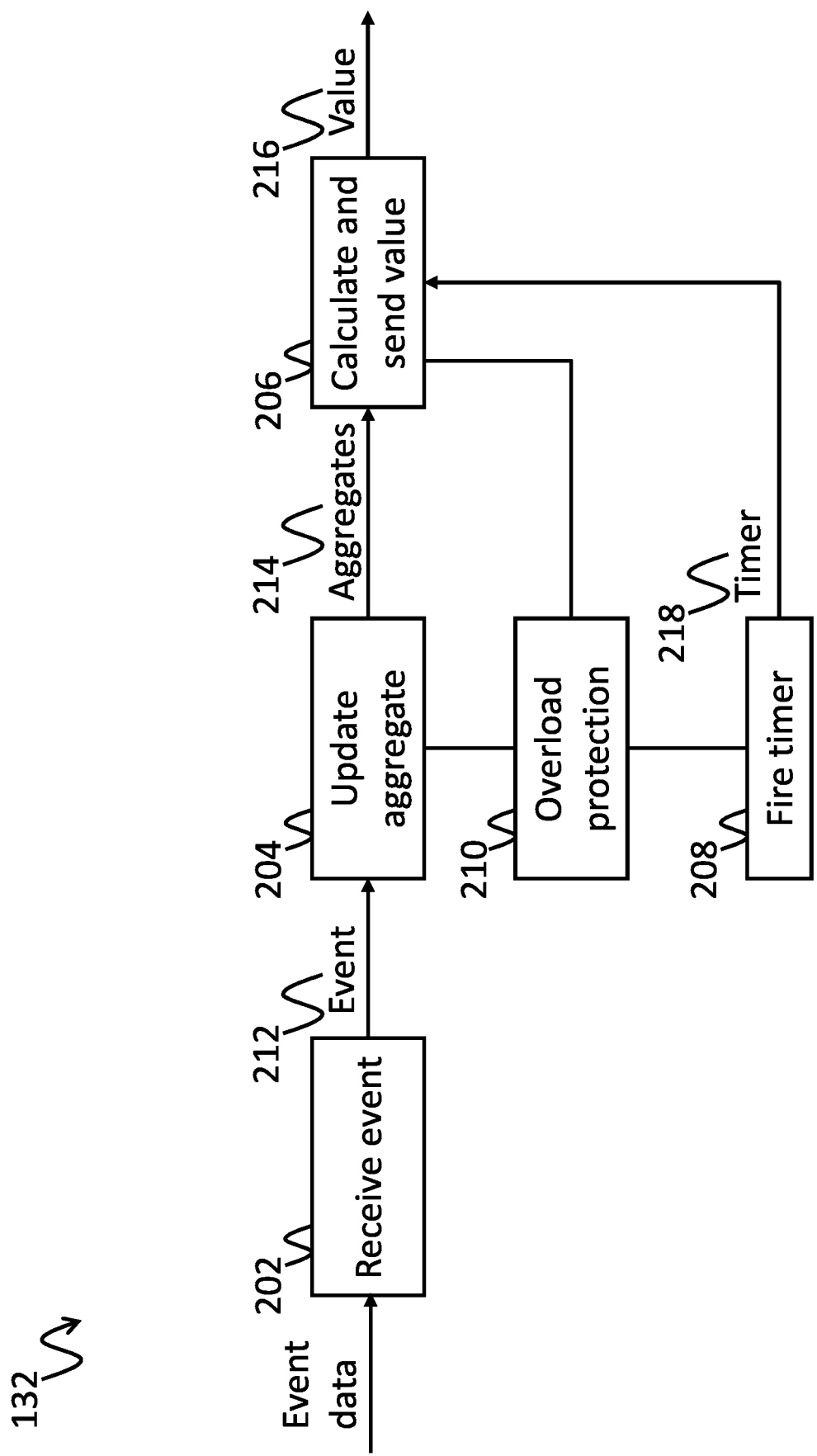
FIG. 2 is a block diagram of a real-time statistical engine according to one embodiment of the present invention.

For the sake of convenience and to provide a concrete example, FIG. 2 depicts a block diagram of a computation pipeline for a real-time statistical engine according to one embodiment of the present invention. In the example herein, each of the entities corresponds to a different statistic related to the operations of a contact center. As noted above, these statistics may include: average interaction handling time (AHT) between customers and agents of the contact center, average waiting time of customers, customer queue lengths, server loads (e.g., CPU, memory, and network usage), interaction abandonment rate, agent occupancy, and the like. The entities (or statistics) calculated by the statistics server 132 running the real-time statistical engine may be subscribed to by various other portions of the contact center. For example, a manager or monitor may have the statistics displayed on a display device of a computer system (e.g., desktop or laptop computer, mobile phone, or tablet). As another example, various statistics may be shown on a "dashboard" of statistics viewable by agents of the contact center, in order to provide the agents with a real-time (or substantially real-time) view of the current status of the contact center. As still another example, various other components of the contact center may programmatically perform functions based on the computed statistics. For example, the routing server 124 may use statistics such as agent availability to assist in routing an incoming interaction to a particular agent, or the interactive media response (IMR) 122 may use statistics such as average waiting time to determine whether to inform a customer of a long wait time and to suggest leaving a voicemail or sending an email. However, embodiments of the present invention are not limited thereto and other embodiments of the present invention may involve real-time computation engines implementing different computational pipelines for computing values for their respective entities.

Referring to FIG. 2, receiver 202 is configured to receive an event from a data source. Embodiments of the present invention may include multiple receivers 202 configured to receive event data from different data sources. Examples of data sources include, but are not limited to, the web servers 120 (which may generate an event every time a web site is "hit," e.g., every time the web servers 120 respond to a request), the multimedia/social media servers 154 (which may generate an event every time a chat message is sent, every time a comment or a post relating to a particular topic or organization is made, every time a user "likes" a post relating to a particular topic or organization, and the like), the call controller 118 (which may generate an event every time call begins and every time a call ends, every time a customer is added to a queue to wait for an agent, and every time a customer is removed from a queue, etc.), an analytics server (which may generate an event every time a particular topic is mentioned in an interaction between a customer and an agent of the contact center), or the interactive media response (IMR) server 122 (which may generate an event every time a customer begins and completes an interaction using the IMR server 122).

An aggregator 204 updates one or more aggregates based on the received event 212. One example of an aggregate is a log of all received events of a given type (e.g., the timestamps of all responses generated by the web servers 120 with status code Server Error 5xx, and, as another example, all responses generated with Successful 2xx status codes). Another example is, when computing an average (e.g., mean) of values, the aggregate may store the underlying components of the average (e.g., the numerator and the denominator) that can be updated when additional events arrive.

Based on the aggregates, a statistic calculator 206 calculates one or more statistics from the aggregates 214, such as by diving the numerator by the denominator in the example noted above. As another example, one statistic may relate to the average handling time (AHT) over the past hour, which is calculated from the data regarding the length of each of the interactions handled by the contact center over the previous hour, while a different statistic may relate to AHT over the past three hours, and still another statistic may relate to the volume of web traffic served by the web servers 120 over the past week.

The calculation of the statistics may be triggered by a timer 208, which sends a timer message 218 to the statistics calculator 206. The values 216 of the computed statistics are then sent to subscribers or subscribing clients (e.g., a dashboard displayed on a display device of a user who is monitoring and managing the contact center, or an alert system for generating alerts to alert users when the contact center is in particular conditions, such as long queues of waiting customers).

According to one embodiment of the present invention, an overload protector 210 is configured to communicate with the aggregator 204, the statistic calculator 206, and the timer 208 to modify or control the operation of the other components and to monitor events or operations performed by the other components.

The number of values for the statistics (or entities) that need to be calculated may depend on client demand. If there are no subscribing clients to the statistics, then no statistics need to be calculated when the timer is triggered. On the other hand, if there are many subscribing clients, and many different statistics being computed, then the load on the real-time statistical engine may be increased.

Furthermore, a high rate of arrival of incoming events can also increase the load on the real-time statistical engine, because each incoming event is used to update one or more aggregates. For example, a contact center may receive many more interactions during peak hours or "rush hour" (e.g., 5 pm to 7 pm on weekdays, after many customers have returned home from work), during which time the call controller 118, web servers 120, and multimedia/social media server 154 may generate events at a higher rate than during other parts of the day, thereby increasing the load on the real-time statistical engine.

Therefore, two major contributors to the load on a real-time statistical engine, or the load on a statistics server 132, are the updating of aggregates (which is responsive to the rate of arrival of events from data sources), and the computing and sending of statistics values. The load resulting from the computing and the sending of statistics values can depend on factors such as the rate at which the statistics are computed (e.g., as controlled by the timer 208), the amount of computing power or data that is to be processed to calculate the statistics, the number of different statistics that are subscribed to (e.g., if two subscribers receive the same statistic, then the statistic may only need to be calculated once), the number of subscribers (e.g., each subscriber will be sent each of the values that they are subscribed to), and the like.

As such, in order to decrease the load on the statistics server, the updating of the aggregates may be paused, or the computation and sending of statistics values can be adjusted. Dropping or otherwise completely ignoring incoming events will generally result in inaccurate statistics. Therefore, although not limited thereto, aspects of embodiments of the present invention relate to overload protection techniques that maintain accuracy of the system by reducing the load due to the computing and sending of statistics, and later, as a more extreme measure by ignoring or dropping received event data such that the aggregates are not updated.

In some embodiments of the present invention, the overload protector 210 is implemented as computer instructions stored in the memory of the statistics server 132 and executed by the statistics server 132 to control the operation of a real-time statistical engine. In some embodiments of the present invention, the overload protector 210 is implemented as a supervisor service or other service that sets configuration parameters of one or more real-time statistical engines running on one or more separate computer systems.

For the sake of convenience, the operation of an overload protector 210 according to one embodiment of the present invention will be described in the context of managing a single real-time statistical engine configured to receive data from one or more external data sources and configured to calculate a collection of different statistics based on the received data. However, embodiments of the present invention are not limited thereto and may be applied to control other types of systems configured to compute values of a collection of entities in real-time or substantially real-time, either as techniques directly integrated into the software controlling the computation of the values of the entities or as a supervisor service controlling the configuration of the real-time engine.

Figure 3:
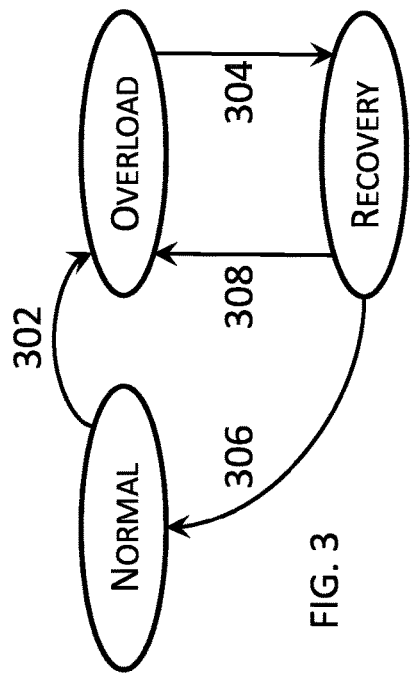
FIG. 3 is a state diagram illustrating various states of the real-time statistical engine when implementing the overload protection according to one embodiment of the present invention.
Figure 4:
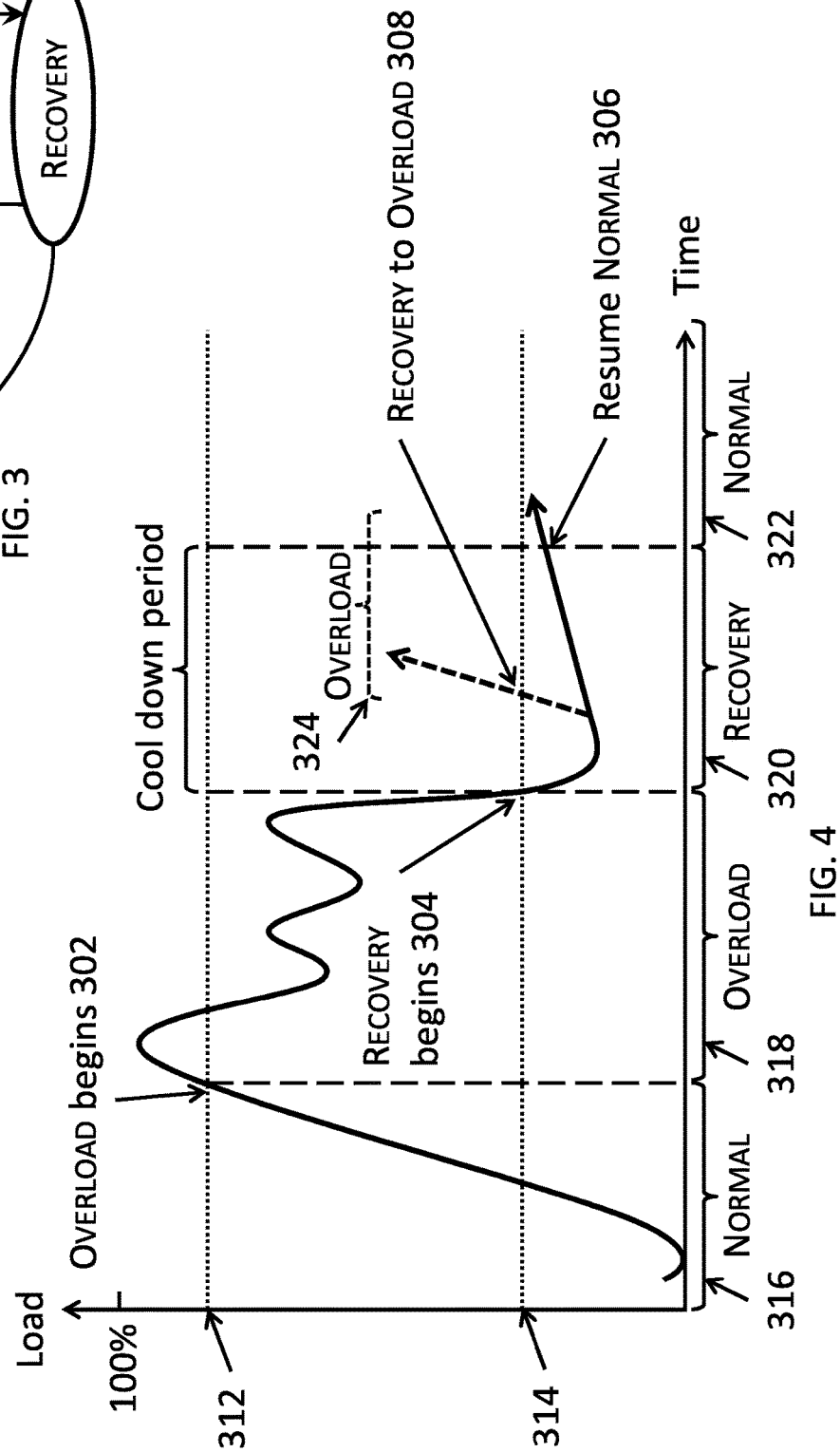
FIG. 4 is a schematic illustration of a changing load on a real-time statistical engine over time and a responses to the changing load in according to one embodiment of the present invention.

FIG. 3 is a state diagram illustrating various states of the real-time statistical engine when implementing overload protection according to one embodiment of the present invention. FIG. 4 is a schematic illustration of a changing load on a real-time statistical engine over time and a responses to the changing load in according to one embodiment of the present invention. According to one embodiment of the present invention, the overload protector 210 may control the real-time statistical engine to be in one of three different states: NORMAL, OVERLOAD, and RECOVERY. As shown in the state diagram of FIG. 4, the system may transition from NORMAL to OVERLOAD 302, from OVERLOAD to RECOVERY 304, from RECOVERY to OVERLOAD 306, and from RECOVERY to NORMAL 308.

FIG. 4 depicts a curve representing the load on the statistics server 132 over time. For the sake of convenience, the load on the statistical server 132 as a whole the will be described herein as a percentage, with 100% indicating full load (e.g., saturation of the computing resource, such as a 100% CPU load or a 100% network load). A high threshold 312 and a low threshold 314, depicted by the horizontal dotted lines, may be set in accordance with typical workload characteristics, such as the typical variance of the load over time and the typical levels of load seen during ordinary operating conditions. For example, the low threshold 314 may be set to a value slightly higher than the overall load experienced during typical operating conditions, and the high threshold 312 may be set to a value that is encountered only a small fraction of the time. For example, for some applications, the high threshold 312 may be set to 90% (or another value less than 100% such that the overload protection is triggered while the computer system remains responsive) and the low threshold 314 may be set to 70%. The high threshold and low thresholds may be set by a configuration parameter.

Many different factors on the statistics server 132 contribute to the load. For example, the operating system kernel, device drivers, and other background services may contribute to the load, in addition to the update of the aggregates and the computation of the values of the entities. However, aspects of embodiments of the present invention are not directed to controlling the operation of these other services directly. Instead, aspects of embodiments of the present invention are directed to controlling the contributions to the load from individual entities, such as the updating of the aggregate and the computation and sending of values in the case of a statistic entity in the context of a real-time statistical engine for a contact center.

During a period 316 when the real-time statistical engine is operating in a NORMAL state, the load remains below the high threshold 312. However, when the load crosses (e.g., exceeds) the high threshold 312 while in the NORMAL state, the state transitions 302 to the OVERLOAD state. During a period 318 that the real-time statistical engine is in the OVERLOAD state, the overload protector 210 may control aspects of the computation of the values of the entities to reduce the load on the statistics server 132. This decrease in load is depicted by the curved, generally decreasing line in the OVERLOAD period 318 of FIG. 4. When the load crosses (e.g., falls below) the low threshold 314, the state transitions 304 to the RECOVERY state and begins a "cool down" period.

If the load remains below the low threshold 314 through the entire cool down period 320, as shown by the solid line in period 320, then the state of the overload protection 210 transitions 306 from the RECOVERY state to the NORMAL state, and normal operations of the real-time statistical engine resume in period 322.

However, if the load exceeds the low threshold 314 at some time during the "cool down" period, the state transitions 308 back to the OVERLOAD state, as shown by the dashed line, and the period 324 labeled OVERLOAD with dashed braces, and operations to reduce the load of the server may continue to be implemented (e.g., by controlling the computation of the values of the entities) until the load decreases to drop below the low threshold 314.

According to one embodiment, each entity or statistic is associated with metadata including how the value associated with the entity is calculated (e.g., executable code for computing the value), its current value, the aggregate or aggregates that the statistic is computed from, its current hit-counts (e.g., representing how often the statistic is accessed, which is representative of the load contribution of the entity, in other words, the contribution the computation of this entity to the overall load), its hit-count thresholds (e.g., representing a threshold that the current hit-counts may cross for triggering a downgrade behavior for the entity), and its current downgrade status (e.g., a Normal status or a downgraded status such as Not_sent or Not_updated). Each statistic may also include information regarding its downgrade policy (e.g., defining how the statistic is downgraded based on current conditions, including different techniques for calculating the statistics, reducing a rate at which the value is calculated or stopping the calculation and sending of values, stopping the update of the aggregate, etc.), priority (e.g., a priority level indicating when the statistic can be downgraded, or whether the statistic can be downgraded at all), reinitialization technique, and the like.

In the case of a real-time statistical engine according to one embodiment of the present invention, the load contribution of each statistic is based on the hit-counts, which include an update hit-count for each statistic, which represents the number of times that an aggregate associated with the statistic is updated, for example, due to the arrival of an event (e.g., a count over a window of time). In one embodiment, the hit-counts are tracked only during the overload and recovery states, and each hit-count is reset (e.g., set to zero) when its corresponding statistic is upgraded back to Normal status. The hit-counts may also include a send hit-count for each statistic, which represents the number of times that a value corresponding to the statistic is computed and sent, for example, due to the triggering of the timer. In some embodiments of the present invention, the update hit-counts and the send hit-counts are refreshed or incremented for the statistic each time that an update of a corresponding aggregate is performed and each time a value is computed, respectively.

While running in a NORMAL state, all of the entities or statistics are in the status Normal, and are members of the set of normal entities or statistics S+. While in an OVERLOAD or RECOVERY state, some of the entities or statistics may have a downgraded status of Not_sent or Not_updated, in which case those downgraded entities or statistics are members of the set of downgraded entities or statistics S−.

Figure 5:
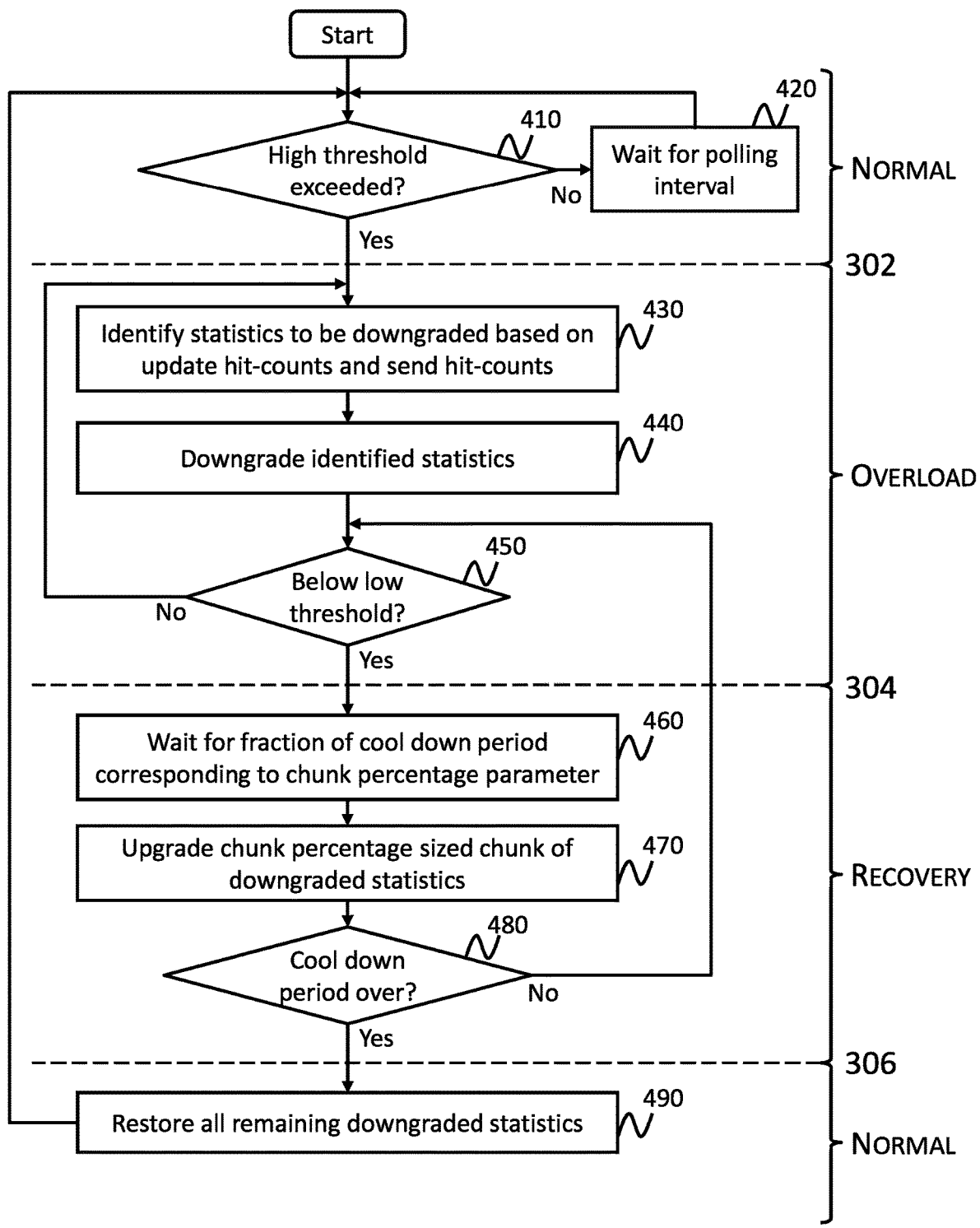
FIG. 5 is a flowchart illustrating a method for providing overload protection according to one embodiment of the present invention.

FIG. 5 is a flowchart illustrating a method for providing overload protection according to one embodiment of the present invention.

Referring to FIGS. 4 and 5, in operation 410, the overload protector 210 determines whether the load on the statistics server 132 has exceeded a high threshold 312. If not, then then the overload protector 210 continues to check (e.g., after waiting for a polling interval or delay in operation 420) for the triggering of an overload state (e.g., polling the load). The exceeding of the high threshold may also be detected based on a trigger that is set by another system monitoring service (e.g., in a "push" arrangement). If the high threshold is detected as being exceeded, then the system transitions 302 to the OVERLOAD state.

To decrease load while in the OVERLOAD state, in operation 430, the overload protector 210 identifies entities or statistics that have high load contributions (that make up a large fraction of the total load on the system), based on their corresponding hit-counts (e.g., the update hit-count and/or the send hit-count). In some embodiments of the present invention, the downgradability of a statistic is further determined based on other metadata associated with the entity, such as the priority. For example, some statistics may be so important (such as for business reasons) that they have a priority that indicates it cannot be downgraded (e.g., a critical statistic). As a specific example, the routing server 124 may depend on accurate and timely statistics about the lengths of call queues and agent availability in order to route interactions to the correct agent. As such, according to some embodiments, only non-critical statistics (or entities having a priority that is not "critical") are selected for downgrading. Statistics that have low update hit-counts or low send hit-counts generally do not need to be downgraded because the hit-counts indicate low levels of activity, and therefore downgrading those statistics would likely have little to no effect on the load. In addition, in some embodiments, statistics are downgraded in groups, based on their priority level, where low priority statistics are downgraded first, and higher priority statistics are downgraded only when the downgrade of the low priority statistics is not sufficient to reduce the load below the low threshold.

In operation 440, the overload protector 210 downgrades one or more of the identified statistics. In circumstances where the send hit-count is high, the overload protector 210 can gradually decrease or downgrade the sending rate of the statistic (e.g., by controlling the timer 208 of the real-time engine, thereby reducing the rate at which new values are computed and reducing the frequency with which clients receive a new value for the statistic. This allows the system to continue to provide accurate information, albeit less frequently, to the clients during high load conditions. In some embodiments, once the send-hit count threshold is reached, sends are completely stopped, and the statistic is transitioned to the downgraded Not_sent status, and the overload protector 210 moves the statistic to the set of downgraded statistics S−.

Generally, skipping updates will result in inconsistent aggregates, and therefore may cause inconsistent or incorrect statistics to be calculated. This may be the case where the aggregates have a historic component. (On the other hand, in the case of aggregates that can be calculated based on instantaneous event data, skipping or aggregates might not result in inconsistent or incorrectly computed values.) Therefore, in some embodiments, the downgrade policy downgrades the calculating and the sending of values first, and downgrades or stops the updates of the aggregates only when the update hit-rate threshold and additional relief to the load is required (e.g., when other downgrade strategies have been exhausted). When the update hit-rate threshold is reached, updates are completely stopped for the given statistic, and the statistic is transitioned to the downgraded Not_updated status and moved to the set of downgraded statistics S−. Furthermore, because the aggregates in this case are no longer being updated, any values computed by the statistic would be inconsistent or incorrect, and therefore the overload protector 210 also stops the sending for the given statistic.

By downgrading statistics and reducing the frequency with which values are computed and sent or reducing the frequency with which aggregates are updated, the overload protector 210 reduces the load on the statistics server 132. In the more general case, embodiments of the present invention are directed to downgrading entities that have high load contributions in accordance with the individual downgrading policies associated with those entities.

In operation 450, the overload protector 210 measures the load on the statistics server 132. Due to changes in the load from the downgrading of the statistics and due to changes in the incoming traffic (e.g., in the rate at which events continue to arrive) the overall load may have changed. If the load is not below the low threshold 314, then the overload protector 210 returns to operation 430 to identify additional statistics to downgrade based on the update hit-counts and the send hit-counts, or to implement further stages of downgrade in accordance with the downgrade policies of the identified statistics.

On the other hand, if the load has been reduced below the low threshold 314, the overload protector 210 transitions 304 to the RECOVERY state and applies "upward pressure" to restore the statistics to normal operation. The transition to the RECOVERY state starts a timer for a "cool down" period, during which groups or chunks of statistics are returned to Normal status (or upgraded), such as by executing the corresponding reinitialization techniques of each entity in the chunk, on a chunk by chunk basis over the course of the cool down period. These upgraded chunks are also moved from the set of statistics in a downgraded state S− to the set of statistics in the normal state S+.

A "chunk percentage" parameter may be used to control the size of each chunk and therefore the granularity of the recovery of statistics to Normal status over the cool down period. For example, in one embodiment, if the chunk percentage is set to 25%, then each chunk corresponds to 25% of all of the statistics in the downgraded state S−. The statistics of each of the four chunks are upgraded, one chunk at a time, at four different times over the course of the cool down period. For example, the first chunk is upgraded after ¼ of the cool down period has elapsed, the second chunk is upgraded after ½ of the cool down period has elapsed, the third chunk is upgraded after ¾ of the cool down period has elapsed, and the last chunk is upgraded at the end of the cool down period.

According to one embodiment, in operation 460, the overload protector 210 waits for a fraction of the cool down period corresponding to the chunk percentage, and then upgrades a chunk of statistics (e.g., a chunk percentage sized chunk of the downgraded statistics) in operation 470. In the more general case, the overload protector 210 upgrades chunks of entities by restoring those entities to their Normal states In operation 480, the overload protector 210 determines if the cool down period has ended. If not, then the process continues to operation 450 to determine if the load is still below the low threshold. If not, such as in the case where the rate of arrival of events is still high or demand for statistics is still high, then the overload protector 210 transitions 308 to the OVERLOAD state again and continues with identifying statistics to be downgraded in operation 430 (this also causes the cool down period to be interrupted and will also cause the cool down period to be restarted the next time the overload protection 210 transitions from the OVERLOAD state to the RECOVERY state). However, if the load is still below the low threshold (suggesting that the rate of arrival of events has decreased or that the demand for statistics has decreased), then the recovery period continues with waiting for another fraction of the cool down period in operation 460, and upgrading more statistics in operation 470.

If, in operation 480, the cool down period is determined to have ended, then the overload protector 210 restores any remaining downgraded statistics in operation 490, and transitions 306 back to the NORMAL state where the overload protector 210 continues with monitoring to determine if the load on the statistics server 132 has exceed the high threshold 312.

The combination of downward controls (through the selective downgrading of statistics having high update hit-counts and/or high send hit-counts) and upward controls (through the centralized upgrading of chunks of statistics) was tested experimentally.

Figure 6:
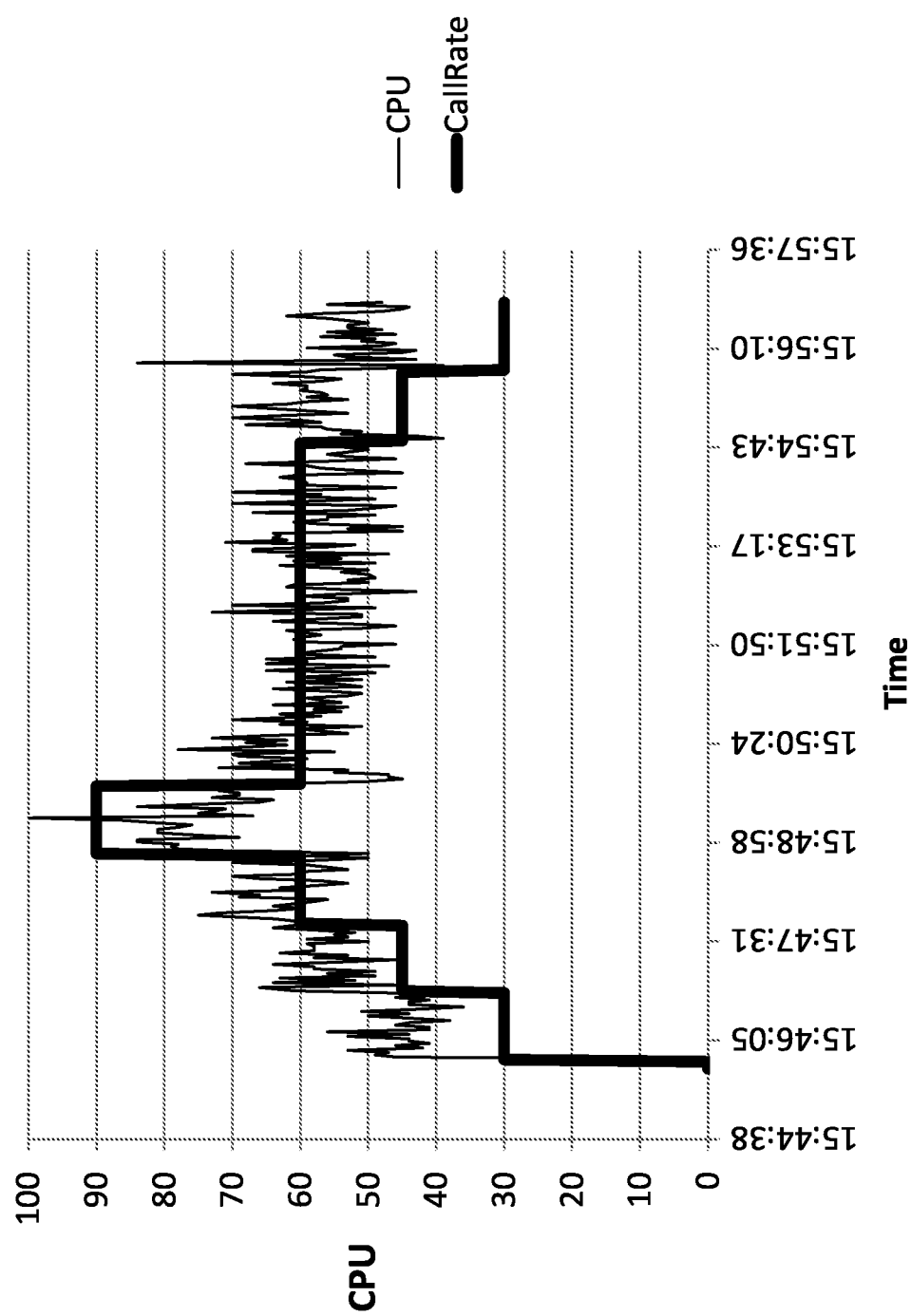
FIG. 6 is a graph of experimental data in which the technique described above is applied to a statistics server running a real-time statistical engine.

FIG. 6 is a graph of experimental data in which the technique described above is applied to a statistics server running a real-time statistical engine. The thick line indicates the current incoming call rate, and the thin line indicates the current CPU load. At approximately time 15:49, the CPU load exceeds the high threshold, causing an overload to be triggered and causing the statistics are downgraded in response. The cooldown period begins at approximately time 15:51, and statistics are upgraded, in groups, until approximately time 15:56, at which time the statistics server has returned to a normal state.

As such, aspects of embodiments of the present invention provide overload protection for real-time statistical engines by providing graceful, fine grained degradation of data sources and centralized restoration of statistics when the load levels have decreased. Embodiments of the present invention do not rely on knowledge of the underlying computations performed when computing each of the statistics, and instead apply a heuristic approach to reducing load on a statistics server 132.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, in some embodiments of the present invention, a linear regression model of load (e.g., CPU usage) may be applied to estimate a fraction of entities that can be upgraded to arrive at a target overall load. With the assumption that transitioning each entity from a downgraded status to a normal status corresponds to a linear increase in the load on the statistics server 132, the upgrade of each chunk of statistics and the corresponding load after the upgrade of that chunk may be taken as a data point. After upgrading a few chunks of downgraded statistics, the data points may be supplied to a linear regression model to generate a best fit line. Accordingly, a target load may be specified (e.g., a load between the high threshold 312 and the low threshold 314), and the intersection of the best fit line with the target load indicates the number of entities that can be run in their Normal state with the target load based on current conditions. Accordingly, the number of entities in the Normal state can be controlled (e.g., by upgrading additional statistics from the set of downgraded statistics S− or downgrading some statistics from the set of upgraded statistics S+) to achieve the target load.

Furthermore, as noted above, embodiments of the present invention are not limited to providing overload protection in the context of statistics for a contact center, and can provide overload protection in real-time or near real-time computer systems configured to compute values for a large number entities and providing the computed values to subscribers.

For example, embodiments of the present invention may be applied to a social networking system, where each account of the social network corresponds to one entity. In this case, an account associated with, e.g., a popular musician, may occasionally experience enormous spikes in activity (e.g., several orders of magnitude more than that an average user). In such cases, overload protection may downgrade the high activity account by decreasing the rate at which updates to the popular account are published to client subscribers (e.g., client programs, such as web browsers, mobile applications, desktop applications, analytics systems, etc.). This downgrade of the entity (social network account) experiencing heavy activity may reduce the load on the computing system and thereby allow the computing system to continue providing service to the other accounts, despite the extremely high activity in a small number of popular accounts.

Computer Systems

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 7A:
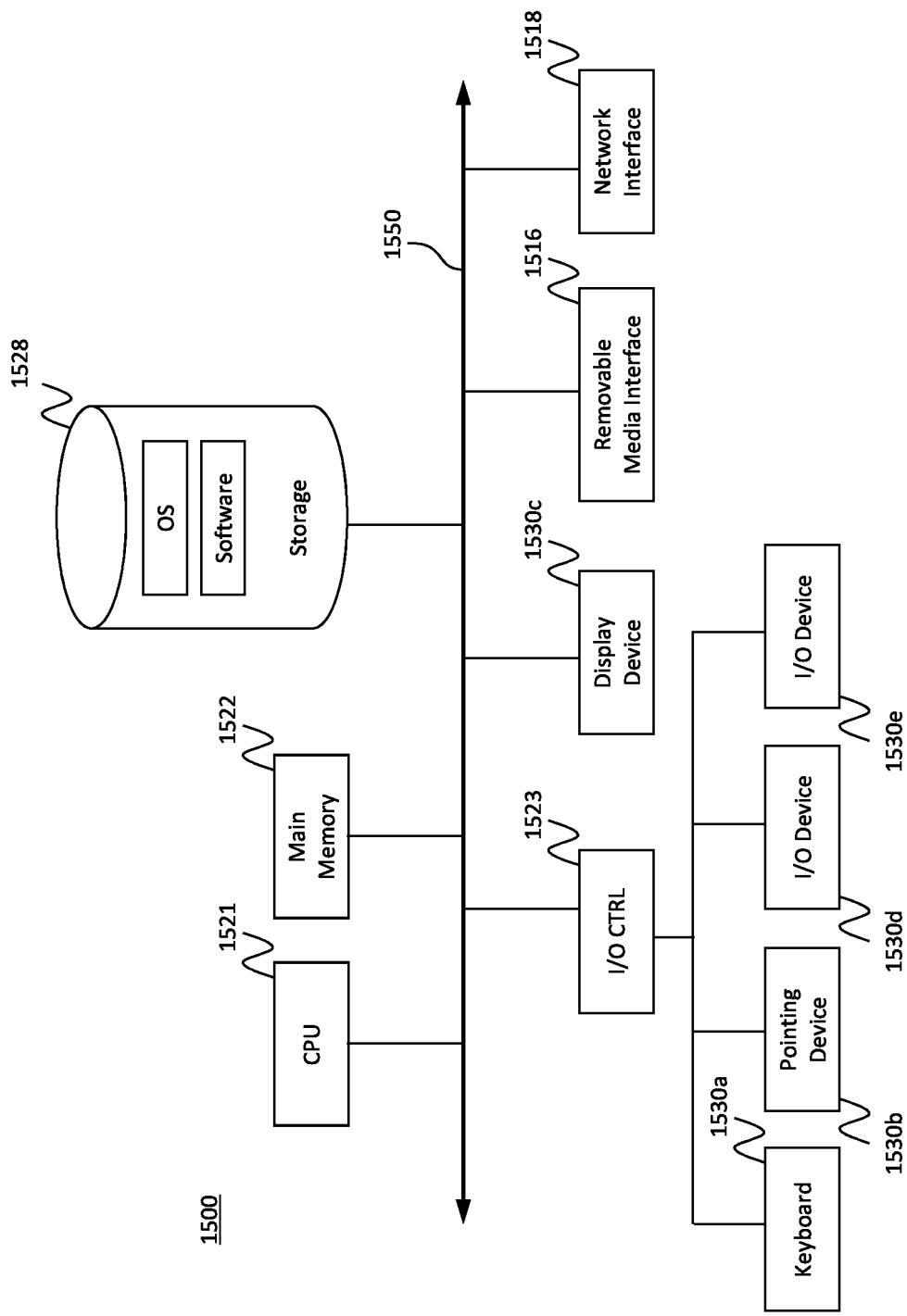
FIG. 7A is a block diagram of a computing device according to an embodiment of the present invention.
Figure 7B:
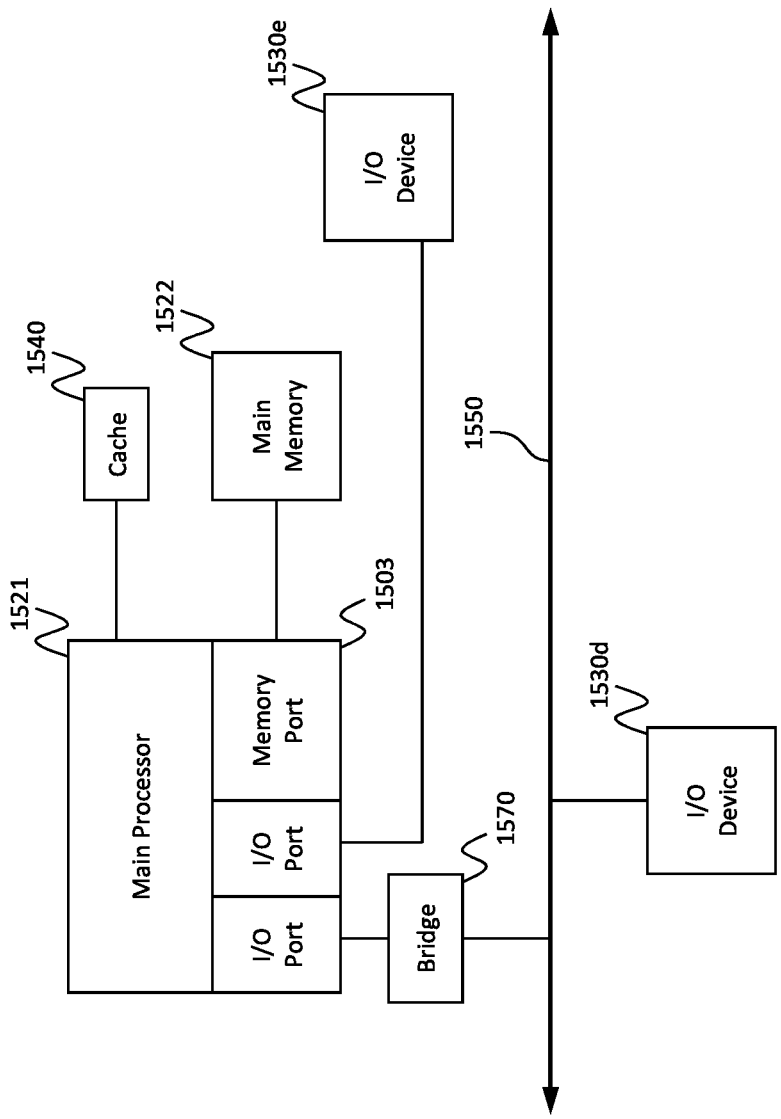
FIG. 7B is a block diagram of a computing device according to an embodiment of the present invention.

FIG. 7A and FIG. 7B depict block diagrams of a computing device 1500 as may be employed in exemplary embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530a and a pointing device 1530b, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 7D:
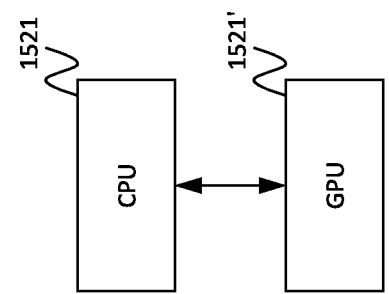
FIG. 7D is a block diagram of a computing device according to an embodiment of the present invention.
Figure 7C:
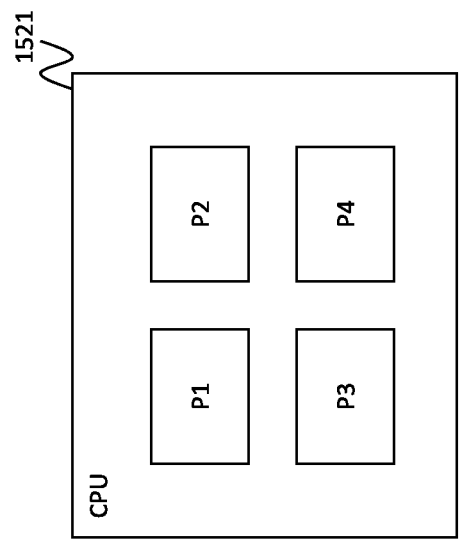
FIG. 7C is a block diagram of a computing device according to an embodiment of the present invention.

As shown in FIG. 7C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
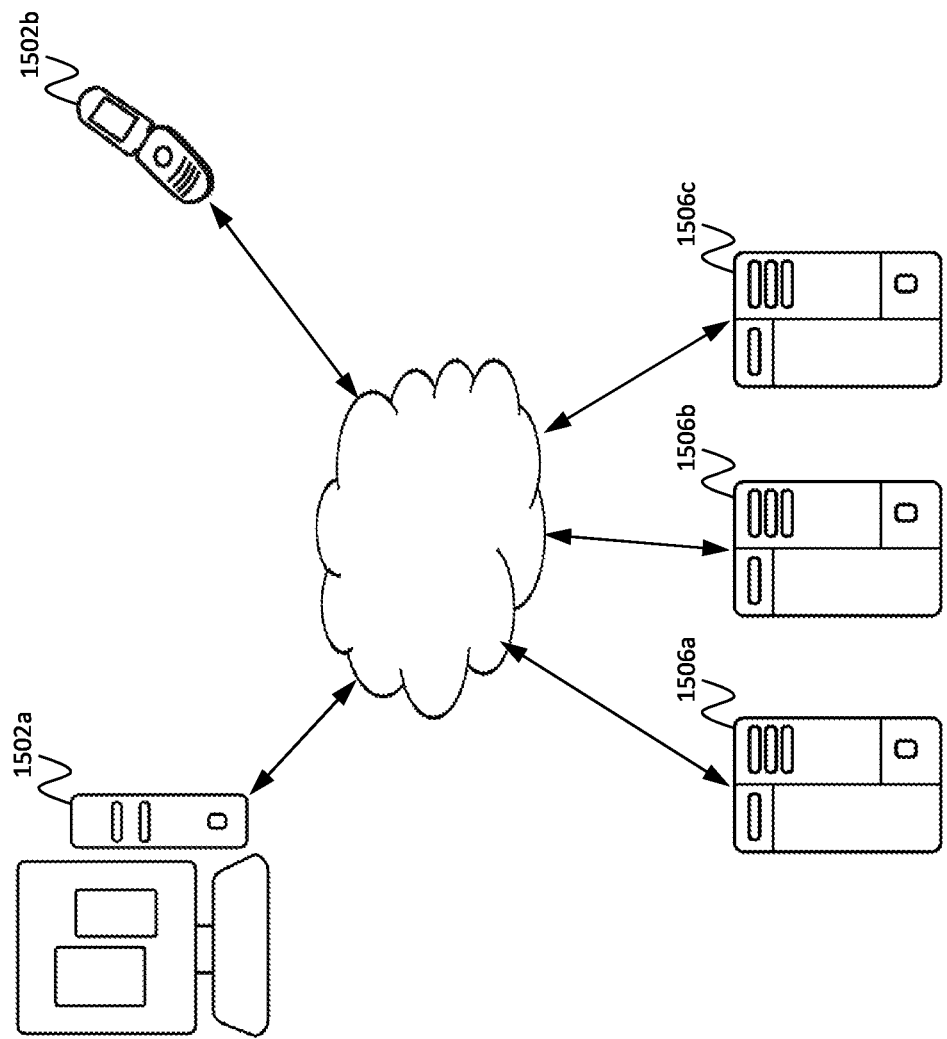
FIG. 7E is a block diagram of a network environment including several computing devices according to an embodiment of the present invention.

A computing device may be one of a plurality of machines connected by a network, or it may comprise a plurality of machines so connected. FIG. 7E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization are also contemplated, such as, for example, the network (e.g. via Software Defined Networking (SDN)). Functions, such as functions of the session border controller and other types of functions, may also be virtualized, such as, for example, via Network Functions Virtualization (NFV).

What is claimed is:

1. A method for providing overload protection to a real-time computational engine of a contact center configured to compute values corresponding to entities, wherein each of the entities is a statistic corresponding to an aspect of contact center operations, and wherein the overload protection is being provided by an overload protector that, based on a load level of a computer system executing the real-time computational engine, controls a transition between a plurality of states, the states comprising: a normal state; an overload state; and a recovery state, the method comprising:
when the overload protector is in the normal state:
detecting a first load level of a computer system executing the real-time computational engine; and
in response to detecting that the first load level exceeds a high threshold, transitioning the overload protector to the overload state;
when the overload protector is in the overload state:

selecting one or more of the entities (hereinafter "selected entities"), the selection being based, at least in part, on identifying ones of the entities that comprise a normal status and high corresponding load contributions;

downgrading each of the selected entities to a downgraded status in accordance with a downgrade policy, wherein the downgraded status is defined as a status in which a given one of the selected entities comprises a lower load contribution than in the normal status;

detecting a second load level of the computer system; and in response to detecting that the second load level is below a low threshold, transitioning the overload protector to a recovery state so to initiate a cool down period; and when the overload protector is in the recovery state:
selecting an anticipated duration for the cool down period;
selecting a chunk percentage parameter;
dividing the anticipated duration of the cool down period into sub-periods in which each of the sub-periods comprises a percentage of the anticipated duration of the cool down period equal to the chunk percentage parameter;
dividing the downgraded selected entities into groups of downgraded selected entities, such that each of the groups of downgraded selected entities comprises a percentage of the downgraded selected entities equal to the chunk percentage parameter; and
successively upgrading the groups of downgraded selected entities within corresponding respective ones of the sub-periods.

2. The method of claim 1, wherein the downgrade policy causes the real-time computation engine to reduce a frequency at which a value associated with a corresponding one of the selected entities is calculated.

3. The method of claim 1, wherein the downgrade policy comprises reducing a frequency at which a value associated with a corresponding one of the selected entities is transmitted to a client.

4. The method of claim 1, wherein the real-time computation engine is configured to:
receive events from an external data source, each of the received events corresponding to one of the selected entities;
in response to receiving each of the events, update an aggregate associated with the corresponding one of the selected entities and compute a value for the corresponding one of the selected entities using the updated aggregate;
wherein the downgrade policy causes the real-time computation engine to stop updating the aggregates in accordance with the received events.

5. The method of claim 1, wherein each of the entities is associated with a corresponding hit-count, the hit-count representing how often the entity is accessed;
wherein the identifying the ones of the entities having the high corresponding load contributions comprises identifying ones of the entities having a high hit-count.

6. The method of claim 1, wherein each of the entities comprises a priority; and
wherein the selection of the selected entities is based, at least in part, on identifying ones of the entities that comprise a lower priority compared to other ones of the entities.

7. The method of claim 1, wherein each of the entities comprises a priority; and
wherein the selection of the selected entities is based, at least in part, on identifying ones of the entities that comprise a priority that is non-critical (hereinafter "non-critical priority").

8. The method of claim 7, wherein the ones of the entities that comprise the non-critical priority comprise ones of the entities unrelated to routing, wherein the ones of the entities unrelated to routing include:
a one of the entities corresponding to a call queue length statistic; and
a one of the entities corresponding to an agent availability statistic.

9. The method of claim 4, wherein the statistics comprise at least two of average handling time, average waiting time, queue length, server load, interaction abandonment rate, and agent availability;
wherein the load level is based, at least in part, on an arrival rate of the events; and
wherein the downgrade policy causes the real-time computation engine to stop calculating a value associated with a corresponding one of the selected entities.

10. A computer system for providing overload protection to a real-time computational engine of a contact center configured to compute values corresponding to entities, wherein each of the entities is a statistic corresponding to an aspect of contact center operations, and the overload protection is being provided by an overload protector that, based on a load level of the computer system, the computer system executing the real-time computational engine, controls a transition between a plurality of states, the states comprising: a normal state; an overload state; and a recovery state, the computer system comprising:
a processor; and
memory having instructions stored thereon that, when executed by a processor, cause the processor to:
execute the real-time computational engine; and
execute the overload protector;
the memory further having instructions stored thereon that, when executed by the processor, cause the processor to:
when the overload protector is in the normal state:
detect a first load level of a computer system executing the real-time computational engine; and
in response to detecting that the first load level exceeds a high threshold, transition the overload protector to the overload state;
when the overload protector is in the overload state:
select one or more of the entities (hereinafter "selected entities"), the selection being based, at least in part, on identifying ones of the entities that comprise a normal status and high corresponding load contributions;
downgrade each of the selected entities to a downgraded status in accordance with a downgrade policy, wherein the downgraded status is defined as a status in which a given one of the selected entities comprises a lower load contribution than in the normal status;
detect a second load level of the computer system; and
in response to detecting that the second load level is below a low threshold, transition the overload protector to a recovery state so to initiate a cool down period; and
when the overload protector is in the recovery state:

select an anticipated duration for the cool down period;

select a chunk percentage parameter;

divide the anticipated duration of the cool down period into sub-periods in which each of the sub-periods comprises a percentage of the anticipated duration of the cool down period equal to the chunk percentage parameter;

divide the downgraded selected entities into groups of downgraded selected entities, which includes the first group of downgraded selected entities, such that each of the groups of downgraded selected entities comprises a percentage of the downgraded selected entities equal to the chunk percentage parameter;

and successively upgrade the groups of downgraded selected entities within corresponding respective ones of the sub-periods.

11. The system of claim 10, wherein the downgrade policy causes the real-time computation engine to reduce a frequency at which a value associated with a corresponding one of the selected entities is calculated.

12. The system of claim 10, wherein the downgrade policy comprises reducing a frequency at which a value associated with a corresponding one of the selected entities is transmitted to a client.

13. The system of claim 10, wherein the memory further has instructions stored thereon that, when executed by the processor, cause the processor to:

receive events from an external data source, each of the received events corresponding to one of the selected entities; and in response to receiving each of the events, update an aggregate associated with the corresponding one of the selected entities and compute a value for the corresponding one of the selected entities using the updated aggregate;

wherein the downgrade policy causes the real-time computation engine to stop updating the aggregates in accordance with the received events.

14. The system of claim 10, wherein each of the entities is associated with a corresponding hit-count, the hit-count representing how often the entity is accessed;

wherein the identifying the ones of the entities having the high corresponding load contributions comprises identifying ones of the entities having a high hit-count.

15. The system of claim 10, wherein each of the entities comprises a priority; and wherein the selection of the selected entities is based, at least in part, on identifying ones of the entities that comprise a lower priority compared to other ones of the entities.

16. The system of claim 10, wherein each of the entities comprises a priority; and wherein the selection of the selected entities is based, at least in part, on identifying ones of the entities that comprise a priority that is non-critical (hereinafter "non-critical priority").

17. The system of claim 16, wherein the ones of the entities that comprise the non-critical priority comprise ones of the entities unrelated to routing, wherein the ones of the entities unrelated to routing include:

a one of the entities corresponding to a call queue length statistic; and a one of the entities corresponding to an agent availability statistic.

18. The system of claim 13, wherein the statistics comprise at least two of average handling time, average waiting time, queue length, server load, interaction abandonment rate, and agent availability;

wherein the load level is based, at least in part, on an arrival rate of the events; and wherein the downgrade policy causes the real-time computation engine to stop calculating a value associated with a corresponding one of the selected entities.

* * * * *